United States Patent [19]

Layre et al.

[11] Patent Number: 5,234,123
[45] Date of Patent: Aug. 10, 1993

[54] EASY-OPEN METAL-PLASTIC LAMINATE CAN LID

[75] Inventors: René Layre, Grenoble; Serge Terroni, Les Abrets, both of France

[73] Assignee: Pechiney Recherche, Courbevoie, France

[21] Appl. No.: 981,386

[22] Filed: Nov. 25, 1992

Related U.S. Application Data

[63] Continuation of Ser. No. 735,852, Jul. 25, 1991, abandoned.

Foreign Application Priority Data

Sep. 10, 1990 [FR] France .................................. 90 11634

[51] Int. Cl.⁵ .............................................. B65D 41/32
[52] U.S. Cl. .................................... 220/266; 229/205; 229/237
[58] Field of Search ............... 220/266, 268, 269, 270, 220/271, 272, 273, 276, 359; 215/232, 253; 229/123.2, 205, 237; 383/207, 209

[56] References Cited

U.S. PATENT DOCUMENTS

| | | | |
|---|---|---|---|
| 1,542,097 | 6/1925 | Ripley | 83/308 |
| 3,909,582 | 9/1975 | Bowen | 229/237 X |
| 4,491,224 | 1/1985 | Horvath | 206/484 |
| 4,740,163 | 4/1988 | Kuchenbecker | 220/266 X |
| 5,000,321 | 3/1991 | Heilmann et al. | 229/238 X |

*Primary Examiner*—Stephen P. Garbe
*Assistant Examiner*—Nova Stucker
*Attorney, Agent, or Firm*—Dennison, Meserole, Pollack & Scheiner

[57] ABSTRACT

The invention relates to lids of easy-opening cans for perishable foodstuffs, and a method of obtaining them. These lids are composed of a metal foil and a plastics film, the metal foil having a mechanical non-traversing pre-incision corresponding to a tearing line and the thermo-shrinkable plastics film having a continuous depression situated opposite the mechanical pre-incision. The pre-incision and the depression, obtained by the action of heat, makes it possible to avoid the defects known as "feathering" and the plastics film is less expensive and more resistant to corrosion than is conventional lacquer.

10 Claims, 1 Drawing Sheet

Fig. 1.
(PRIOR ART)
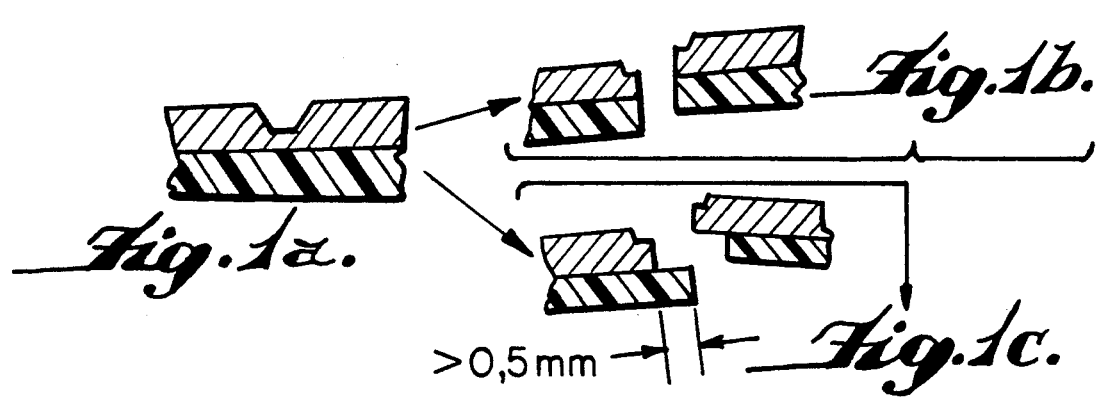
Fig. 1a. Fig. 1b. Fig. 1c.
Fig. 2.
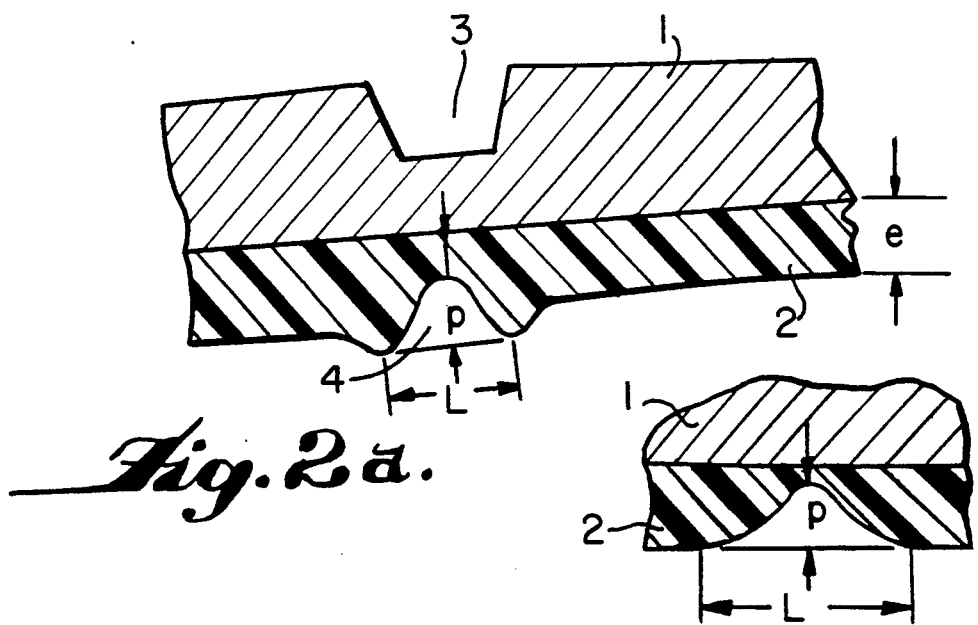
Fig. 2a. Fig. 2b.

EASY-OPEN METAL-PLASTIC LAMINATE CAN LID

This is a continuation of copending application Ser. No. 07/735,852, filed Jul. 25, 1991 now abandoned.

The invention relates to lids for easy-open cans for perishable foodstuffs and a method of obtaining such lids.

At the present time, so-called easy-open lids for cans of foods generally consist of a metal covered on the inside with a protective lacquer avoiding direct contact between the foods and the metallic lid so providing a protection against the corresponding phenomena of corrosion and/or contamination of the lid and/or the contents respectively.

As is well known, these lids are generally pre-incised by punching on the metal side (on the outer face), according to the design of the desired tearing line when the part (or whole) of the lid corresponding to the intended aperture is torn away.

It is also known that attempts have been made to replace the lacquer by a polyolefin thermoplastics film (of PE, PP) but this becomes greatly distorted at the tear off level, giving rise to faults which are referred to as "feathering", characterised in that the cut through the tear has a stepped profile. The maximum tolerated width of elongation of the film at the level of the tear is 0.5 mm.

The present invention avoids this fault; they have found that in order to obtain a clean tear, that is to say one which is substantially rectilinear in the direction of the thickness, the lid had to have opposite the pre-incision of the metal, a "pre-incision" of the plastics material in the form of a continuous depression or furrow. This must make it possible for a thickness of plastics film of at least 2 $\mu$m and preferably at least 5 $\mu$m in its smallest dimension to remain in order to prevent corrosion of the metal.

The nature of the plastics material used which is glued or heat sealed against the metal is a heat-shrinkable polyolefin, polyamide or polyester and is preferably a polyethylene or a polypropylene or their polymers or their mixtures, preferably orientated or bi-orientated, and their thickness being comprised between 10 and 100 $\mu$m. The use of bi-orientated polypropylene provides the best results. The metal used is generally an aluminium alloy of series 5000 or 3000 using the designations of the Aluminium Association and is in particular the alloy 5052, condition H19, 230 to 330 $\mu$m thick.

The width of the furrow present in the plastics material may be as much as 150 $\mu$m, this distance being measured either between the peaks of the crests which border the furrow or between the edges of the depression at the level of the free surface of the plastics film. Beyond this value, widening the furrow is no longer useful and furthermore there is the risk of not maintaining the minimum value of the thickness of plastics film in the bottom of the said furrow.

The furrow in the thermoplastics film is obtained by using a substantially punctiform source of concentrated heat which is displaced continuously along the desired tear line, the operating parameters being regulated in such a way as to obtain the above-mentioned dimensional characteristics of the furrow.

This concentrated heat source is preferably obtained by means of a beam of focussed rays such as those of an arc or incandescent lamp or better still that of a continuous laser beam.

Of course, the displacement of this concentrated heat source may be controlled in displacement (co-ordinates x, y parallel with the plane of the lid) and/or in rotation about an axis (perpendicular to the plane of the lid) in order to follow the desired pre-incision contour, at a specific speed.

The invention will be more clearly understood from the following example which is illustrated in FIGS. 1 and 2.

FIG. 1 represents, in a prior art laminate of an easy-opening can lid, a shearing rupture of the metal-plastics complex, FIG. 1a illustrating the initial state, FIG. 1b a rupture qualified as being good while FIG. 1c shows a rupture qualified as being poor.

FIG. 2 shows a cross-section through a lid according to the invention at right-angles to the furrow, this latter possibly having two different profiles (FIGS. 2a or 2b).

Therefore, the lid according to the invention comprises a metal-plastics laminate consisting of a metal layer 1 glued or heat sealed to a heat-shrinkable plastics film 2, the lid comprising on the outer face a "mechanical" pre-incision 3 here of trapezoidal form, and the plastics film of thickness a comprising on the inner face a "thermal" pre-incision, or furrow 4 opposite to the pre-incision 3. This pre-incision 4 has a width L and a depth p, the residual thickness being r.

EXAMPLE 1

On a lid consisting of a metal layer 1 of an alloy 5052 with a thickness of 220 $\mu$m in condition H19 comprising a metal layer 1 having a non-traversing trapezoidal pre-incision 3 of the following dimensions:

small base: 50 $\mu$m
large base: 100 $\mu$m
height: 150 $\mu$m is glued by means of a "solventless" adhesive, Lofol 7750 produced by Messrs. HENKEL, is a bi-orientated polypropylene film 15 $\mu$m thick (supplier: BOLLORE, reference: BOLPHANE—BF 13).

The thermal pre-incision 4 of the film was carried out with a $CO_2$ laser beam ($\lambda = 10.6$ $\mu$m) of 20 W, displaced at a speed of 300 m/min, the focussing spot having a diameter of 100 $\mu$m at the level of the film surface, the focal distance being 50 mm, on an apparatus produced by Messrs. CILAS, $CO_2$ laser, 50W, variable power. The furrow obtained had the following characteristics:

depth P: 10 $\mu$m
width L: 150 $\mu$m
residual thickness r: 5 $\mu$m

Continuity of the film at right-angles to the laser produced furrow 4 was tested by a $CuSO_4$ with or without one hour of conditioning and sterilising post-firing at 120° C.; no porosity was observed.

This tests consists in immersing or coating the sample with an aqueous solution containing 10 g Cu sulphate and 50 cc hydrochloric acid (d=1.18) per liter at ambient temperature for 10 mins. It is possible with the naked eye to observe and count the black spots which form and which correspond to any porosity in the plastics film.

The method according to the invention therefore makes it possible to avoid the defect of "feathering" and furthermore, it is thought that thermal incision makes it possible locally to reinforce the adhesion of the plastics film to the metal opposite the pre-incision 3 in the metal foil, so improving its tearing properties.

The products according to the invention are also less expensive than those which comprise a lacquer, hence a considerable economic advantage, and the plastics film offers greater resistance than lacquer to corrosion.

We claim:

1. A lid for an easy-opening can comprising a laminate of a metal foil (1) and a heat-shrinkable plastics film (2) and including a non-traversing mechanical pre-incision (3) of the metal foil on an outside face, wherein the heat-shrinkable plastics film has on its outside face a continuous depression (4) opposite the pre-incision.

2. A lid according to claim 1, wherein the plastics film (2) is a heat-shrinkable resin selected from the group consisting of polyolefin, polyamide and polyester.

3. A lid according to claim 2, wherein the plastics material (2) consists of a bi-orientated polypropylene.

4. A lid according to one of claims 1 to 3, wherein the thickness e of the film (2) is between about 10 and 100 $\mu$m.

5. A lid according to one of claims 2 to 3, wherein the residual thickness r of the plastics film (2) is greater than or equal to 2 $\mu$m.

6. A lid according to claim 5, wherein the residual thickness r of the plastics film (2) is greater than or equal to 5 $\mu$m.

7. A lid according to one of claims 2 to 3, wherein the width (1) of the depression is less than or equal to 150 $\mu$m.

8. A lid according to one of claims 1 to 3, wherein the metal foil is an Al alloy selected from the group consisting of series 5000 and 3000 alloy.

9. A method of producing an easy-opening lid for a can according to one of claims 1 to 3, comprising the steps of: forming a laminate of a metal foil and a heat-shrinkable plastics film; forming by a source of concentrated heat a non-traversing pre-incision corresponding to a tearing line in an outer surface of the metal foil; forming a depression (4) in the outer surface of the plastics film opposite the tearing line, said depression being formed.

10. A lid according to claim 8, wherein the continuous depression (4) is laser beam generated.

* * * * *